UNITED STATES PATENT OFFICE.

OTTO ERNST, OF HÖCHST-ON-THE-MAIN, GERMANY, ASSIGNOR TO THE FARB-WERKE, VORMALS MEISTER, LUCIUS & BRÜNING, OF SAME PLACE.

VIOLET AZO DYE AND PROCESS OF MAKING IT.

SPECIFICATION forming part of Letters Patent No. 610,349, dated September 6, 1898.

Application filed November 7, 1896. Serial No. 611,407. (Specimens.)

*To all whom it may concern:*

Be it known that I, OTTO ERNST, a citizen of the Empire of Germany, residing at Höchst-on-the-Main, Germany, have invented certain new and useful Improvements in the Manufacture of a New Violet Monoazo Dyestuff Giving a Fast Brown by Oxidation with Chrome, of which the following is a specification.

No azo dyestuffs which were of any value in the arts have heretofore been obtained from diazotized amidonaphtholsulfonic acids. I have found that such dyestuffs may be obtained from 1.8 diazonaphtholsulfonic acids, on the one hand, and alpha-naphthylamin or its alkyl and alphyl derivatives, respectively, on the other hand, ("alphyl" meaning an aromatic radical, and therefore alphyl derivatives of alpha-naphthylamin are compounds, such as phenylnaphthylamin, $C_{10}H_7-NHC_6H_5$, and tolylnaphthylamin, $C_{10}H_7-NHC_6H_4CH_3$.) These dyestuffs are of great interest on account of their great fastness to light and as they produce by treatment with chromates or chromic acid on the fiber brown powerful tints of special fastness to milling and light, dyeing evenly also when applied to loose wool.

The new dyestuff may be obtained by allowing the diazotized 1.8.4 amidonaphtholsulfonic acid to act upon the hydrochlorid of alpha-naphthylamin in the presence or absence of acetates or by dissolving the amin in alcohol and then combining it with the diazo compound. The reaction of diazotized 1.8.4 amidonaphtholsulfonic acid with alpha-naphthylamin is explained by the equation:

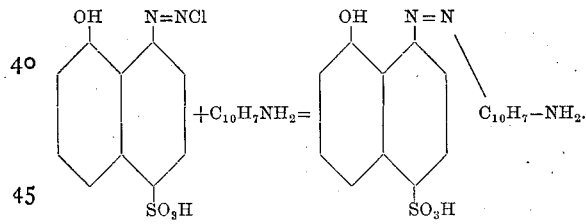

Example: 2.39 kilograms of 1.8 amidonaphthol 4 sulfonic acid are, together with 0.42 kilogram of caustic soda, dissolved in about ninety liters of water; 0.69 kilogram of nitrite of sodium, dissolved in a small quantity of water, are added and the solution kept cold, allowed to run into forty kilograms of ice-cold diluted hydrochloric acid, containing 0.92 kilogram of the acid, the solution being well stirred. The diazonaphtholsulfonic acid separates at once as a yellow-brown precipitate. 1.43 kilograms of alpha-naphthylamin are dissolved in a solution of thirty liters of hot water and the calculated quantity of hydrochloric acid, the solution being cooled down to about 25° centigrade by the addition of ice and the diazo compound allowed to run in. Three kilograms of crystallized sodium acetate are added, whereupon the formation of the difficultly-soluble dyestuff begins. After stirring for several hours and gradually heating the solution up to 80° centigrade the combination is complete. By the addition of a solution of 2.2 kilograms of soda and subsequent heating the dyestuff is transformed into the sodium salt. The latter forms in dry condition a green-black powder of metallic luster, soluble with difficulty in cold, more easily in hot, water, with a red-violet color. By the addition of some common salt a brown precipitate is obtained from this solution.

The sodium salt of the dyestuff is soluble in concentrated sulfuric acid with a grayish-green color and gives by the addition of water a violet precipitate. The dyestuff has the following formula:

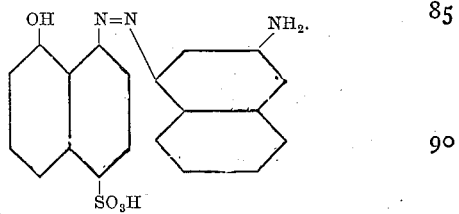

The dyestuff dyes wool violet in an acid-bath, and on treatment with chromates or chromic acid an even saturated brown of beautiful shade is obtained, which is fast to milling and light.

Having described my invention, I claim as new and desire to secure by Letters Patent—

1. The process of producing a new monoazo dyestuff which consists in combining diazotized 1.8.4 amidonaphtholmonosulfonic acid with alpha-naphthylamin, substantially as described.

2. As a new article of manufacture, the new monoazo dyestuff, derived from diazotized 1.8.4 amidonaphtholmonosulfonic acid and alpha-naphthylamin and having the formula:

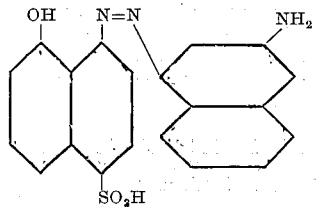

the sodium salt of the dyestuff forming a green-black powder of metallic luster, soluble with difficulty in cold, more easily in hot water, with a red-violet color, soluble in concentrated sulfuric acid with a gray-green color and giving by the addition of water a violet precipitate, dyeing wool violet in an acid-bath and producing by treatment with chromates or chromic acid an even, saturated brown color of beautiful shade fast to milling and light, substantially as set forth.

In testimony that I claim the foregoing as my invention I have signed my name in presence of two subscribing witnesses.

OTTO ERNST.

Witnesses:
HEINRICH HAHN,
ALFRED BRISBOIS.